Oct. 16, 1951  H. C. TELLOCK  2,571,784
SUSPENSION FRAME BUMPER
Filed March 29, 1947

INVENTOR
HAROLD C. TELLOCK
BY
Toulmin & Toulmin
ATTORNEYS

Patented Oct. 16, 1951

2,571,784

UNITED STATES PATENT OFFICE 2,571,784

SUSPENSION FRAME BUMPER

Harold C. Tellock, Chicago, Ill., assignor to Tucker Corporation, Chicago, Ill., a corporation of Delaware Application March 29, 1947, Serial No. 738,126

5 Claims. (Cl. 267—21)

The present invention deals with the means employed to suspend a vehicle frame from the wheel and is concerned primarily with a bumper element designed to come into effect when limits of movement are approached.

The use of so-called parallelogram supports in the field of automotive engineering is today meeting with more and more recognition. As the name implies a parallelogram support is a device the sides of which remain in parallel relation during various operative positions. Thus, with the parallelogram support definite assurance is had that the wheel of the vehicle will remain in a vertical position during all the phases of spring action.

Such a parallelogram support ordinarily includes spaced parallel upper and lower suspension arms, a vertical bracket to which the arms are pivotally attached and which is in turn secured to the frame or chassis of the vehicle and a vertical member at the wheel end of the arms.

It is evident that as the vehicle in which such a parallelogram support is included travels over the irregularities of a road surface the wheel moves relative to the chassis. This movement is accommodated by the parallelogram support and during such movement the angle between the parallelogram arms and the vertical member at the wheel varies.

With the above outlined conditions in mind the present invention has in view as its foremost objective the provision of a bumper element which is included in the parallelogram support and which is arranged to come into effect when extreme angular positions are reached. Thus, the resistance to deformation of the parallelogram normally offered by the usual spring means included in such a parallelogram is increased when critical angular limits are approached.

More in detail, the invention has as an object the provision of, in a parallelogram support of the character indicated, of a bumper element which is carried by the vertical member at the wheel end of the parallelogram and which bumper element takes the form of a block of rubber or other comparable resilient material and which is formed with inclined faces, one of which is adapted to engage one of the suspension arms when a critical angular limit is reached.

Various other and more detailed objects and advantages such as arise in connection with carrying out the above noted ideas in a practical embodiment will in part become apparent and in part be hereinafter stated as the description of the invention proceeds.

The invention, therefore, comprises a parallelogram support for motor vehicle suspension which includes a resilient bumper which comes into effect when critical angular limits of deformation of the parallelogram are reached.

For a full and more complete understanding of the invention, reference may be had to the following description and accompanying drawings wherein.

Figure 1:
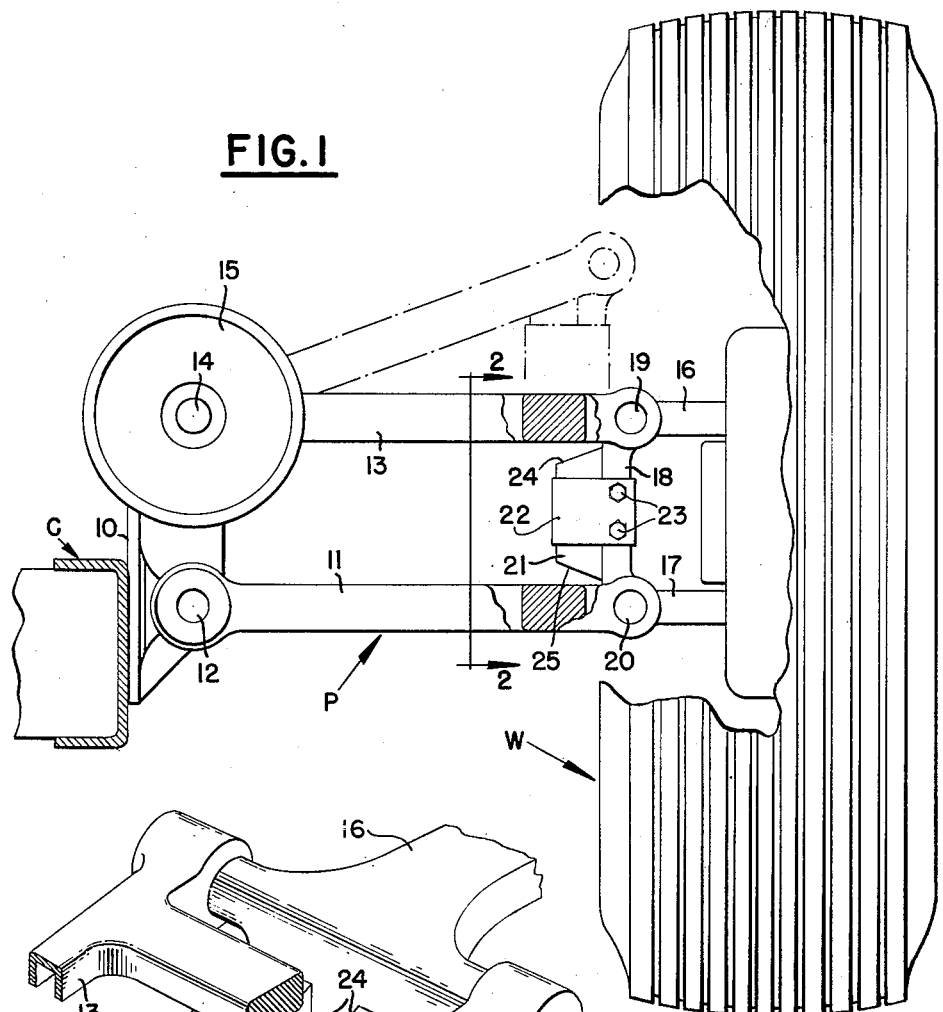
Figure 1 is a view looking from one end of a motor vehicle including a parallelogram support which embodies the principles of this invention. In this view parts are shown in elevation and other parts are broken away and shown in section to more clearly bring out the details in construction.
Figure 2:
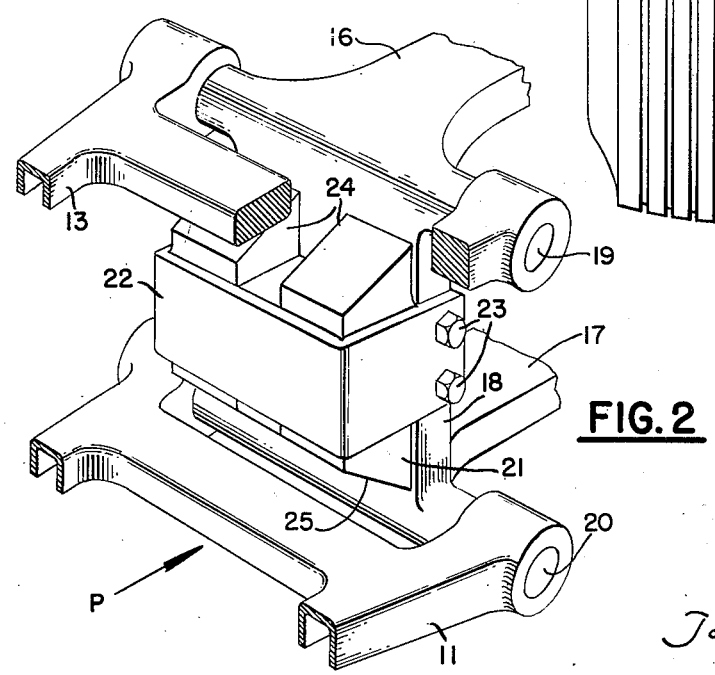
Figure 2 is an enlarged detailed perspective of the bumper and element on which it is mounted.

Referring now to the drawing wherein like reference characters denote corresponding parts, the chassis of a motor vehicle is designated C while a wheel is indicated at W. Obviously there will be four of the wheels W and the chassis C is suspended from these wheels by four individual parallelogram supports, one of which is shown in Figure 1 and referred to in its entirety by the reference character P.

The parallelogram support P comprises a bracket 10 which is anchored to the chassis C and upstands therefrom. A lower suspension arm 11 is pivotally mounted on the bracket 10, the pivotal connection being shown at 12. An upper suspension arm 13 is also pivotally supported from the bracket 10 as indicated at 14 but a rubber torsional spring which is shown diagrammatically at 15 is associated with this pivotal connection 14.

A U-shaped bracket comprising horizontal arms 16 and 17 joined by a vertical upright 18 is included as a part of the wheel assembly W. The upper suspension arm 13 is pivotally mounted at one corner of this U-shaped bracket as shown at 19 while the lower suspension arm is pivotally mounted at the other corner of the U-shaped bracket as depicted at 20.

It is evident that as the chassis C moves relative to the wheel W the members 10 and 18 remain substantially vertical but the angular disposition of the arms 11 and 13 changes. This means that as the wheel W goes up with respect to the chassis C the angle between the arm 13 and upright 18 becomes smaller as is shown by the broken line illustration of Figure 1. In order to supplement the resistance offered by the spring 15 when this angle approaches its critical limit the bumper now to be described is provided.

The bumper takes the form of a block 21 which is held in position on the upright 18 by a U-shaped retaining member 22 which has its ends anchored to the member 18 as by the bolts shown at 23. The block 21 may be made from any appropriate material having the required properties of resiliency and elasticity so as to perform the function required of it. It will be noted that the upper face of the block 21, which face is designated 24, assumes an acute angular relation with respect to the upright 18. It is this angular disposition of the face 24 and its spacing from the upper arm 13 that determines when the block 21 actually begins to function.

When the critical angle is approached the face 24 engages the under surface of the suspension arm 13 as illustrated by the broken lines of Figure 1 and further upward movement of the wheel relative to the chassis takes place only against the resistance which the block 21 offers to compression.

The block 21 is also formed with a lower face 25 which is comparable to the top face 24 but which is inclined in an opposite direction so as to cooperate with the lower arm 11 when the wheel W approaches a critical limit of movement downwardly with rspect to the chassis C.

It is evident that by employing appropriate material such as rubber or a rubber composition and properly dimensioning the block, particularly as to its relation with respect to the arms 11 and 13, definite assurance will be had that critical angular limits will never actually be reached but only approached under conditions of resistance offered by the block.

It will be further understood that one of the bumpers 21 will be included in the parallelogram support for each of the four wheels of the vehicle.

While preferred specific embodiments of the invention are hereinbefore set forth, it is to be clearly understood that the invention is not to be limited to the exact constructions illustrated and described because various modifications of these details may be provided in putting the invention into practice within the purview of the appended claims.

What is claimed is:

1. In a vehicle frame suspension, a wheel, a chassis, a parallelogram support suspending said chassis from said wheel, said parallelogram support including a vertical member and a normally horizontal arm member pivotally connected to said vertical member, and a bumper element of resilient material carried by one of said members and positioned in the angle between them at a point adjacent their pivotal connection to be engaged by the other of said members.

2. In a vehicle frame suspension, a wheel, a chassis, a parallelogram support suspending said chassis from said wheel, said parallelogram support including a vertical member and a normally horizontal arm connected thereto, and a bumper block carried by said vertical member and positioned in the angle between said arm and vertical member to be engaged by said arm at a point closely adjacent to its pivotal connection to the vertical member when a critical angle is approached.

3. In a vehicle frame suspension, a wheel, a chassis, a parallelogram support suspending said chassis from said wheel, said parallelogram support comprising a vertical bracket connected to said chassis, a pair of spaced normally horizontal arms pivotally secured to said bracket, a vertical member carried by said wheel and pivotally connected to the other ends of said horizontal arms, and a resilient block carried by said vertical member and being disposed between said horizontal arms with its ends lying adjacent to the pivot points of the arms to be engaged by the arms when they deflect a predetermined amount.

4. In a vehicle frame suspension, a wheel, a chassis, a parallelogram support suspending said chassis from said wheel, said parallelogram support comprising a vertical bracket connected to said chassis, a pair of spaced normally horizontal arms pivotally secured to said bracket, a vertical member carried by said wheel and pivotally connected to the other ends of said horizontal arms, a resilient block having oppositely inclined faces on the inner side of said vertical member, and means for retaining said block in position on said vertical member.

5. In a parallelogram support of the type indicated, bumper means comprising a resilient block having oppositely inclined faces, a U-shaped retaining member partially enclosing the central portion of said block and leaving the inclined faces exposed, and means at the free ends of said retaining member for securing to a vertical element of said parallelogram support.

HAROLD C. TELLOCK.

REFERENCES CITED

The following references are of record in the file of this patent:

UNITED STATES PATENTS

| Number | Name | Date |
|---|---|---|
| 1,735,708 | Wright | Nov. 12, 1929 |
| 1,882,484 | Carpenter et al. | Oct. 11, 1932 |
| 2,076,722 | Heinze | Apr. 13, 1937 |
| 2,137,848 | Macbeth | Nov. 22, 1938 |
| 2,222,265 | Parker | Nov. 19, 1940 |

FOREIGN PATENTS

| Number | Country | Date |
|---|---|---|
| 431,720 | Great Britain | July 15, 1935 |
| 592,036 | Germany | Jan. 31, 1934 |
| 57,665 | Denmark | June 3, 1940 |